United States Patent [19]

Erickson

[11] 3,968,281

[45] July 6, 1976

[54] FILTER MOLDED HEATING AND/OR INSULATING MEMBER

[75] Inventor: Ronald E. Erickson, Oconomowoc, Wis.

[73] Assignee: Sybron Corporation, Rochester, N.Y.

[22] Filed: July 15, 1974

[21] Appl. No.: 488,262

[52] U.S. Cl. .................. 428/75; 219/213; 219/319; 219/460; 219/464; 428/80; 428/284; 428/411; 428/446

[51] Int. Cl.[2] .................. B32B 1/04; B32B 3/02

[58] Field of Search .................. 161/156, 182, 206; 13/20, 22; 219/319, 460, 464, 213; 264/87; 428/302, 411, 446, 75, 80, 284

[56] References Cited

UNITED STATES PATENTS

| | | | |
|---|---|---|---|
| 3,350,493 | 10/1967 | Randall | 13/22 |
| 3,479,490 | 11/1969 | Stark | 219/213 |
| 3,500,444 | 3/1970 | Hesse et al. | 219/544 |
| 3,649,406 | 3/1972 | McNish | 264/87 |
| 3,736,159 | 5/1973 | Gibson et al. | 264/87 |
| 3,786,162 | 1/1974 | Colson | 219/390 |
| 3,819,468 | 6/1974 | Sauder et al. | 161/156 |
| 3,832,273 | 8/1974 | O'Connor | 161/206 |

*Primary Examiner*—Marion E. McCamish
*Attorney, Agent, or Firm*—Theodore B. Roessel; Roger Aceto

[57] ABSTRACT

A filter molded heating and/or insulating member having a ceramic gasket bonded thereto and method of its manufacture.

8 Claims, 2 Drawing Figures

FILTER MOLDED HEATING AND/OR INSULATING MEMBER

BACKGROUND OF THE INVENTION

The present invention relates generally to filter molded heating and/or insulating bodies and more particularly to such bodies as may be employed as modular units in the construction of, and/or covers for high temperature furnaces.

Techniques for filter molding heating and/or insulating bodies are well-known in the art. One technique is described for example, in Hesse et al., U.S. Pat. No. 3,500,444. Briefly, the filter molding technique involves dispersing an inorganic refractory fiber and a suitable binder in a liquid suspension. A pressure differential is then created across a filter screen so that the liquid passes through the screen while the refractory members build up and accumulate a layer on the screen. After a suitable accumulation, the layer is removed and allowed to dry to form the body of insulating material. By placing a heating element against the screen prior to creating the differential pressure, the layer of insulating material can be built up about the element to form an electrical heating unit encapsulated with in an insulating refractory support. Smaller individual units formed in this manner may be stacked or otherwise assembled with similar units to form a larger heating unit.

One of the preferred binders utilized in such a method is colloidal silica. Where colloidal silica is used as the binder, it is known that upon drying of the filter formed body, there will be a movement or migration of the colloidal silica to the outer surface of the shape. This results in a case hardened exterior and a soft weak interior.

This case hardened exterior presents somewhat of a problem in modularized construction in that it is difficult to establish a seal good heat seal between the hardened surfaces of adjacent modules. In cases where insulating bodies are formed in this manner without the heating element, as may be used for example, as a furnace cover, the problem again exists of the hardened surface of the cover sealing effectively against the hardened surface of the furnace wall.

Simply placing a high temperature gasket, such as a ceramic fiber batting, between the adjacent surfaces will not completely solve the heat sealing problem because such gaskets are fairly delicate and difficult to position and handle. Another attempt of solving the gasket problem is shown in U.S. Pat. No. 3,786,162 wherein the adjacent surfaces of the modules are shaped complementary so as to mechanically engage each other.

In the present invention, a insulating body and/or heating element and its method of manufacture is provided wherein a layer of ceramic fiber blanket material is bonded to the surface of the insulating body by colloidal silica present at the surface for case hardening the body.

SUMMARY OF THE INVENTION

The present invention may be characterized in one aspect thereof by an insulating body having a first layer filter molded from colloidal silica and an inorganic refractory fiber in a liquid suspension, the first layer being with or without an incapsulated heating element; and a second layer of ceramic fiber blanket material bonded to a surface of the first layer remote from the heating element by colloidal silica present at the interface between the layers.

OBJECTS OF THE INVENTION

One object of the present invention is to provide a method for making a case hardened filter molded insulting body having a gasket intimately bonded to a surface thereof.

Another object of the present invention is to provide an insulating body filter molded from a liquid suspension of an inorganic refractory fiber, the body having a relatively hard exterior surface and a relatively soft interior with one surface of the body having bonded thereto a relatively soft gasket material.

Yet another object of the present invention is to provide a heating unit suitable for the modularized construction of furnaces.

These and other object, advantages and characterizing features of the present invention will become more apparent upon consideration of the follow detailed description thereof when taken in connection with the accompanying drawings.

DESCRIPTION OF THE PREFERRED EMBODIMENTS

Figure 1:
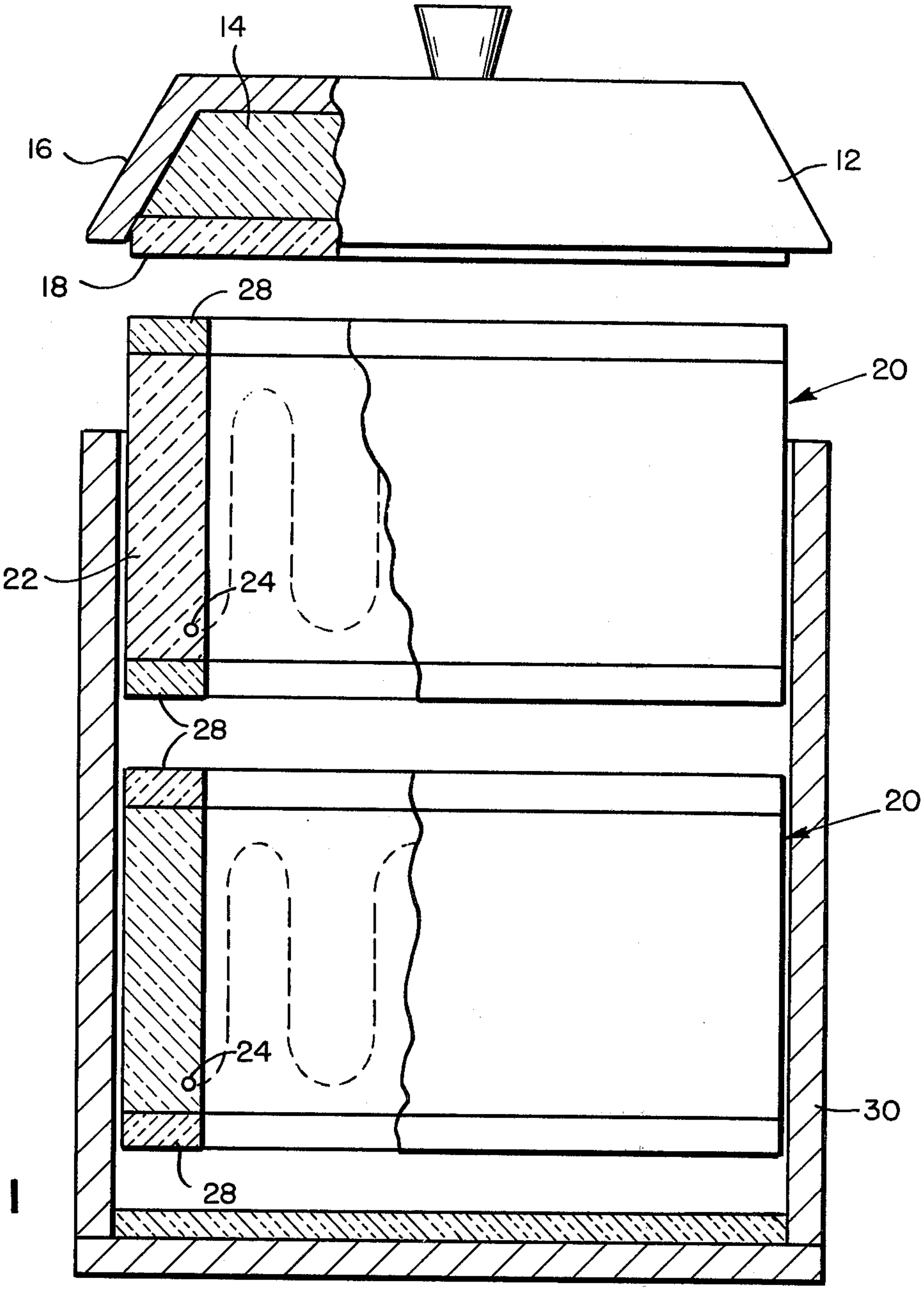
FIG. 1 is an exploded view partly broken away in section showing a kiln assembled from various components made in accordance with the present invention.

Referring to the drawings, FIG. 1 shows a lid or furnace cover generally indicated at 12 to include an insulating body 14 of a mass of integrated inorganic refractory fibers filter molded from a liquid suspension of the fiber. The insulating body is nested in a cup-shaped metallic shell 16. Bonded to one surface of the insulated body in accordance with the method of the present invention is a gasket 18 formed from a ceramic blanket material.

The present invention may also take the form of a heating unit generally indicated at 20. Like cover 12, heating unit 20 consists of a insulating body 22 formed of a mass of inorganic refractory fibers filter molded from a liquid suspension of the fibers. While body 22 is shown as being annular, it should be appreciated that this may be of any convenient shape, as for example, the flat plate shown in FIG. 2. In any event, disposed within the insulating body about the inner periphery thereof, is an electrical heating element 24. Insulating body 22 may be filter molded in situ about heating element 24 in a manner well known in the art.

Bonded to one or both of the top and bottom surfaces of insulating body 22, are gaskets 28 made of a ceramic blanket.

As set out herein above the filter molding of an insulating body of a mass of inorganic refractory fiber from a liquid suspension of the fiber and a suitable binder is well known in the art and is described, for example, in Hesse et al. U.S. Pat. No. 3,500,444. It is also well known in the art that if colloidal silica is used as the binder, the colloidal silica will migrate to the surface of the body during the drying process to produce an insulator having a case hardened exterior and a relatively soft resilient interior. When the surface of the insulating body is case hardened in this fashion, it is difficult if not impossible to produce an effective heat seal when insulating bodies are stacked or assembled, as for example, to form the furnace shown in FIG. 1.

Therefore, according to the present invention, a ceramic blanket material, such as is shown at 18 and 28, is pressed against the surface of the insulating body after the body has been removed from the screen of the filter mold and while the body is still wet. Now, as the insulating body dries, the colloidal silica, which migrates to the surface of the insulating body wets the blanket and acts as a bonding agent or adhesive to bond the layer of ceramic blanket material to the insulating body. The ceramic blanket itself may be any suitable ceramic fiber blanket which is either woven or matted. One suitable material is FIBERFRAX ceramic fiber batting, sold by the Carborundum Company. This material is formed from bulk ceramic fibers interlocked to form a strong resilient insulation.

The thickness of the blanket material employed may vary, however, it is important that the material be sufficiently thick, so that the exposed surface of the blanket will remain dry when the blanket layer is pressed against the still wet body of insulating material. Otherwise, it should be appreciated that colloidal silica present in the liquid would tend to pass through and harden the exposed surface of the blanket layer and impair the effectiveness of the blanket to act as a gasket material. Since the blanket is relatively soft when compared to the case hardened exterior of the filter molded insulating body, any two insulating bodies, as for example, cover 12 and heating unit 20 can be rested one on another in a heat sealing relationship. In this respect, the ceramic blanket being soft will deform to seal any irregularities so as to produce an effective heat seal between and two bodies.

Thus, the present invention now makes it relatively simple to construct any insulating surface by placing together blocks of the filter molded insulating body having bonded to one surface thereof the ceramic blanket. If one or more of the insulating bodies also contains an electric heating element, a modularized furnace may be constructed, as shown for example, in FIG. 1 where two identical heating units 20 are stacked within a metal shell 30 to form a relatively large heating chamber.

Figure 2:
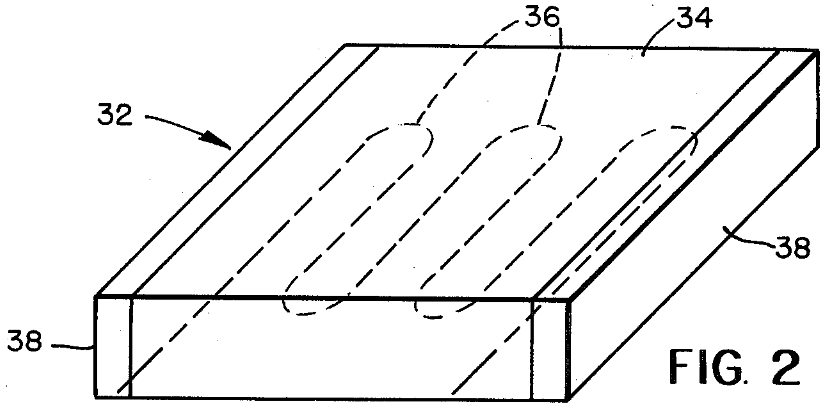
FIG. 2 is a perspective view showing a heating element as may be made in accordance with the present invention.

Another embodiment, as shown in FIG. 2, is in the form of a plate heater, generally indicated at 32 formed by filter molding an insulating body 34 about an electrical heating element 36. The ceramic blanket 38 is bonded to the side of the heating unit normal to the surface containing the heating element so that two or more of the plates may be placed side by side to form a relatively large heating surface.

Thus, it should be appreciated that the present invention accomplishes its intended objects in providing an insulating body filter molded from a liquid suspension of an inorganic refractory fiber and colloidal silica wherein the body has bonded to a surface thereof, an insulating gasket of ceramic blanket. By effecting the bond with colloidal silica present at the surface of the insulating body, the case hardened surface is provided with a relatively soft gasket material permitting the stacking of one insulating body on another in a heat insulating relationship. Further, since the ceramic blanket is bonded to the insulating body by the colloidal silica, no other adhesive need be applied to the blanket to effect the bond.

Having thus, described the invention in detail, what is claimed as new is:

1. A insulating body comprising:

a. a pair of members, each including i. a first layer of an integrated mass of inorganic refractory fibers filter molded from a liquid suspension of said refractory fibers and colloidal silica, and ii. a second layer of ceramic fiber blanket material bonded to a surface of said first layer after the filter molding and before the drying thereof, the bonding being accomplished by colloidal silica present at the interface between said first layer and said second layer; and b. said members resting one against the other with said layer of ceramic fiber blanket material on each member being in abutting relationship so as to form a heat sealing resilient gasket between said members.

2. An insulating body as in claim 1 wherein at least one of said members is annular with an electric heating element embedded about the inner periphery of said first layer, each end face of said first layer having a layer of said ceramic fiber blanket material bonded thereto.

3. An insulating body as in claim 2 wherein said members are disposed in open ended metallic shells which leave at least one surface of each member exposed, said layer of ceramic fiber blanket matrial being on said exposed surfaces.

4. A insulating body as in claim 1 wherein said ceramic fiber blanket material has a thickness sufficient to prevent the saturation thereof and the wetting of the exposed surface of said second layer by colloidal silica passing into said second layer from said first layer.

5. An insulating body comprising:

a. a pair of insulating members resting one against the other, each of said members being formed by filter molding from a liquid suspension of an inorganic refractory fiber and colloidal silica;

b. gasket means for heat sealing between said members including a layer of a ceramic fiber blanket material having one face bonded to a surface of at least one of said members after the filter molding and before the drying thereof, the bonding being accomplished solely by colloidal silica present on the surface of said filter molded insulating member; and c. said layer of ceramic fiber blanket material having a thickness sufficient to prevent the saturation of said layer and wetting of the unbonded face thereof by said colloidal silica.

6. An insulating body as in claim 5 wherein said gasket means includes a layer of said ceramic fiber blanket material on each of said members.

7. An insulating body as in claim 5 wherein at least one of said members has an electric heating element embedded therein.

8. An insulating body as in claim 5 wherein said members are annular and are stacked one on top of another, at least one of said members having an electrical heating element embedded about the inner periphery thereof.

* * * * *